COLLOIDAL SUSPENSION OF FERROMAGNETIC IRON PARTICLES

Filed Aug. 27, 1963

FERROMAGNETIC IRON PARTICLES

INVENTOR
JOHN R. THOMAS
BY P. E. Johnston
B. L. Rowland
ATTORNEYS

United States Patent Office 3,281,344

Patented Oct. 25, 1966

3,281,344

COLLOIDAL SUSPENSION OF FERROMAGNETIC IRON PARTICLES

John R. Thomas, Lafayette, Calif., assignor to Chevron Research Company, a corporation of Delaware Filed Aug. 27, 1963, Ser. No. 304,855
12 Claims. (Cl. 204—158)

This application is a continuation-in-part of my copending application Serial No. 55,705, filed September 13, 1960, now abandoned.

This invention concerns the preparation and composition of ferromagnetic iron particles. More particularly, this invention concerns the preparation and composition of ferromagnetic iron particles existing in an organized arrangement dispersed in an organic medium.

Magnetic materials have a wide variety of applications. Of particular interest to present-day technology are particles which are single domain. Many metal particles greater than 1000 A. are found to be multidomain; the particles or crystals have a number of areas in which the magnetization vectors are in different directions. The direction of the magnetization vector does not abruptly change between two areas or domains. Rather, the domains are separated by a domain boundary or Bloch wall, the wall permitting a gradual change of direction in the magnetization vector. When the particle or crystal is subjected to an external field, the domain boundary moves so as to enhance those domains which are aligned with the field at the expense of those domains which are unaligned. The boundary wall movement results in an increased magnetic induction in the particle.

The boundary wall requires a finite volume. Therefore, particles can be prepared which are too small to maintain two domains. These particles are referred to as single domain.

In the absence of a boundary wall, the particles respond to the field by rotation of the magnetization vector. This is opposed by crystal anisotropy. For, in a ferromagnetic crystal, there are easy axes of magnetization. When the easy axis is not aligned with the field, the magnetization vector will rotate into a non-preferred position. The rotation of the magnetization vector in opposition to the crystal anisotropy requires greater energy than the movement of a boundary wall. The difficulty in rotating the magnetization vector is reflected in the coercive force. The coercive force is the field necessary to bring the magnetic induction (B) in a sample magnetized by field H back to zero.

Crystal anisotropy is not the only factor in determining the coercive force. Four other types of anisotropy are said to contribute: shape, strain, surface and exchange. In the present invention, most of the concern will be directed toward crystal anisotropy and shape anisotropy.

It has now been found that iron particles having ferromagnetic properties and being single domain can be prepared existing in an organized arrangement by the decomposition of an iron-organic compound in the presence of an inert solvent and a polymer of at least 10,000 molecular weight.

Figure 1:
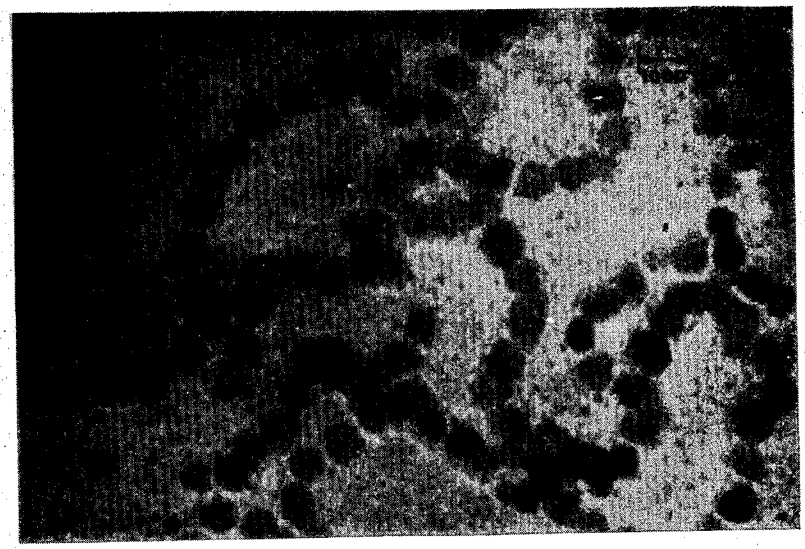
Figure 2:
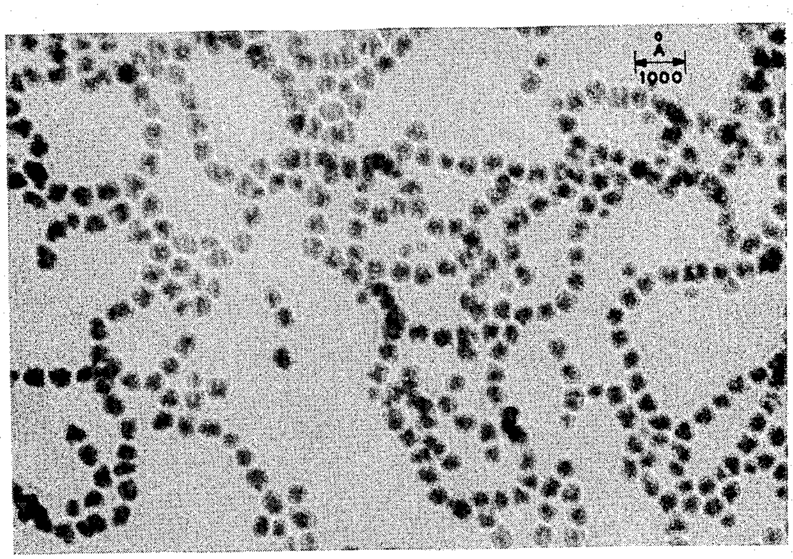

The accompanying FIGURES 1 and 2 are enlarged electron micrographs of the particle compositions.

The metal particles prepared in this invention are predominantly iron metal. Their shape is generally roughly spherical, cylindrical or parallelepiped. The particles range in size from about 100 to 1000 A. and preferably 100 to 500 A. (75%, preferably 85%, by weight of the metal present is in the form of particles of the designated size range.) Because of the small size of the particles, they are single domain.

The particles are found to be of relatively uniform size. In most of the preparations, the particles do not differ by more than a factor of 2 from the mean size—as measured by the longest edge, axis or diameter of the particle. (Usually 85% of the weight of the metal is present as particles of the designated size range.) In preferred samples, the particles will not differ by more than a factor of 1.5 from the mean size (±50% from the mean size, with at least 75% by weight of the metal present as particles in the designated size range).

The particles which are not spherical, which customarily appear rectangular in the photomicrograph, will generally have a ratio of a longer edge to the shorter edge of not greater than 2, and more generally not greater than 1.5.

The particles prepared in this invention do not exist randomly dispersed but assume an organized arrangement. They appear similar to the arrangement of streptococci. The organization is that of a line, chain, or string of beads. Occasionally, the chain will close to form a circle. The chains have at least 5 members; usually 10 or more members and chains of 100 or more members have been noted. A particle in the chain is customarily separated by not more than 50 A., and preferably by not more than 20 A., from the adjoining particle in the chain, as evidenced by an electron photomicrograph. Customarily, at least 25% by weight of the metal will be present as particles in chains, preferably 35% and more preferred 65% by weight. In particularly preferred preparations, 90% by weight of metal will be present as particles in chains.

Each particle is surrounded by a polymer envelope. The polymer acts as a buffer and prevents the particles from bonding together to form larger aggregates or crystals. In this way, the particles remain small and single domain for indefinite periods of time. The dispersion of the metal particles in the polymer provides a mobile medium of ferromagnetic material, useful in a large variety of applications.

The particles are usually prepared as stable colloidal suspensions. The suspensions will be stable for at least a day and usually more. The suspension will customarily be at least 65% (preferably 85%) by weight of solvent, and for most uses will not be higher than 99%. The amount of polymer will depend upon the weight of metal. For a stable suspension, there is generally a weight ratio of polymer to metal of from about 0.1 to 5, more generally 0.2 to 1. The necessary amount of polymer will vary with the composition and molecular weight. The weight of metal will usually vary from about 0.5 to 10% by weight of the composition. Preferred compositions will have 1 to 5% by weight. Once prepared, the composition may be concentrated to a high of 25% by weight of metal, more generally 20% by weight of metal.

In order to obtain stable suspensions, it is necessary that the solubility parameters of the polymer and solvent be similar. A definition of solubility parameters is found in Tobolsky, Properties and Structures of Polymers, John Wiley & Sons, New York (1960), pages 64 ff. The solubility parameter is defined as the square root of the cohesive energy density. The cohesive energy density is defined as the molar energy of vaporization divided by the molar volume.

While these properties are relatively easily determined for a solvent, they are difficultly determined for a polymer. Therefore, the solubility parameter for the polymer is not obtained directly. Rather, a slightly cross-linked polymer is prepared and a series of identical samples of the polymer is placed in a series of liquids of known solubility parameter. The extent of swelling caused by the various solvents is plotted against the solubility parameter for the solvent. The swelling will show a maximum at some point on the solubility parameter scale. This point defines the solubility parameter of the polymer. For particles of the size of this invention, it is preferred that the solubility parameter of the polymer differ by not more than 1.3 and preferably not more than 0.5 unit from the solubility parameter of the solvent.

Once the suspension has been prepared, the solvent may be exchanged to a different inert solvent. The solvents will usually have a dielectric constant in the range of 1.7 to 20.

Compositions may also be obtained in which all the solvent has been removed and only polymer and metal remain, the metal being dispersed in the polymer. The weight percent of the metal in the composition can be varied widely. Usually, the weight of the metal will be in the range of from 0.1 or 1 to 98%.

The novel chained metallic iron particles of from about 100 to 1000 A. are obtained by the energetic decomposition of an organo-iron compound present in a sufficient amount to form a substantial amount of particles over about 100 A. in size in the presence of an inert solvent and a polymer.

The decomposition is caused by introducing sufficient energy into the molecule to cause bond scission. This can be done mechanically, thermally or by electromagnetic radiation. When a particular compound permits, the thermal method of decomposition is preferred.

The organo-iron compound is one in which the metal is bonded to carbon, preferably coordinately bonded to carbon. In forming coordination compounds or complexes, orbitals of the metal atoms are involved in bonding which are not ordinarily used in the simple metal compounds. In iron, the 3-d orbitals are involved.

The iron atoms can be bonded to a variety of compounds and radicals, e.g., arenes, cyclopentadiene, nitroso, carbon monoxide, etc. There is a preference for those compounds in which the iron is coordinately bonded to at least one carbonyl (carbon monoxide) group. Among these compounds, particularly preferred compounds are those in which iron is solely bonded to carbonyl, such as iron pentacarbonyl and tri-iron dodecacarbonyl.

It is also preferred that iron be in its zero or neutral valent state.

If desired, other metal compounds may be introduced in the reaction medium and decomposed along with the iron compound. In practice, other metal compounds are hard to find which respond to the reaction system in a manner similar to the iron compounds. With those compounds which decompose more rapidly or more slowly, mixtures will usually be obtained. However, alloys can be achieved with other organo-metallic compounds which decompose at a rate similar to that of the iron compound, if the metal is able to fit in the iron crystal structure.

The solvent for the system must be relatively inert to the reactants and product and must be able to dissolve both the organo-metallic compounds and the polymer.

Groups which are chemically reactive to the reactants or products should generally be avoided. However, small amounts of reactive functional groups will find use in particular applications.

The preferred solvents are those of dielectric constant of about 1.7 to 2.5, hydrocarbons and inert halohydrocarbons. Aromatic hydrocarbons are particularly preferred, that is, aromatic hydrocarbons of about 6 to 12 carbons, e.g., benzene, xylene, toluene, cymene, cumene, tetralin, mesitylene, durene, etc. It is generally preferred to have a solvent with a boiling point in the desired temperature range. In this manner, the refluxing solvent provides temperature control.

Halohydrocarbons which find use are the halogenated aromatic hydrocarbons, such as fluorobenzene, chlorobenzene, etc.

It is necessary that the solvent be inert to both the reactant and the product. It is found that a number of compounds, particularly those compounds with active hydrogen, such as acidic hydroxyl groups and amino groups, will react with either the reactant or the product. Therefore, significant amounts of materials containing active hydrogen should be avoided.

It is found, however, that in many instances the product may be improved in coercive force, particle size and uniformity of size by having a co-solvent or additive present. With some polymers and solvents, additives can be necessary to obtain chaining. The amount of the co-solvent may vary from about 0.05% to about 5% by weight of the total solvents. The co-solvents are materials which have greater polarity (as indicated by dipole moment) than the major constituent of the solvent, and usually have a heteroatom of Group VI of the Periodic Table, that is, chalcogen of atomic number 8 through 16, oxygen or sulfur.

As already indicated, the polarity of the additive should be greater than the polarity of the solvent. Both dielectric constant and dipole moment are functions of polarity. While the dipole moment is the preferred measure of polarity, there are limitations to its use. For while a solvent may have a functional group which ordinarily would impart a high dipole moment to the molecule, when there ar two of the same functional groups symmetrically disposed in the molecule, the dipole moments of each cancel. In those instances, the dipole moment might be quite low, but the solvent's polarity in the sense of being able to solvate charged particles would be very high. Subject to the above limitation, discussions of polarity will be concerned with differences in dipole moment.

Preferably, the additive should not be of significantly greater polarity than the most polar groups in the polymer. The more polar the additive, as compared to the polarity of the polymer, the less the amount that should be used. Therefore, the preferred additive is of greater polarity than the solvent and of less polarity than the most polar groups in the polymer; the amount of additive should diminish as the polarity of the additive increases.

A further limitation on the choice of additive is its effect on the solubility of the iron compound and the polymer. The additive should not desolubilize the metal compound and the polymer. Moreover, as in the case of the solvent, the additive should be relatively inert to the reactant and product.

The additives which find use are ethers, ketones, esters, and their thio analogs, e.g., thioethers, thioesters, and thiones. These compounds include the common functional groups: carbonylic (oxo and non-oxo), ether-oxy and the thio analogs. The additive will usually not exceed 20 carbons, that is, usually in the range of 3 to 15 carbons, and more usually, 6 to 13 carbons.

Illustrative of various compounds coming within the class are the following:

Among ethers and thioethers are di-n-butyl ether, phenetole, diphenyl ether, dibutylsulfide, lauryl methyl ether, etc.

Among oxo-carbonyl compounds, i.e., ketones and thiones, are acetophenone, 2-octanone, benzophenone, benzothiophenone, phenyl 2-furyl ketone, etc.

Among non-oxo-carbonyl, e.g., esters, are phenyl butyrate, naphthyl acetate, octyl acetate, cyclohexyl benzoate, phenyl thioacetate, etc.

The amount of additive may range as high as 15% by weight of the solvent. However, in most instances, the amount of additive will be 5% or less, and particularly preferred is 2% or less. As little as 0.1% can frequently provide improved results.

The additives can be mono- or polyfunctional. They can be diethers—such as acetals and ketals—diones, diesters, but will rarely have more than two functional groups per molecule.

The polymer plays a decisive role in the preparation of the novel chained particles. The role of the polymer is not entirely understood; however, it is assumed that as the iron-organic compound begins to decompose, the resulting metal particles are preferentially surrounded by polymer. The polymer acts as a physical buffer between the particles. The metal particles are, therefore, prevented from forming large crystals by bonding together; rather, the particles grow by having atomic metal or a few atoms of metal desposited on the surface of the initially formed metal nuclei. In this way, the particles grow smoothly, form in a relatively uniform size and remain discrete and mobile.

In order that the polymer be preferentially absorbed on the particle surface, it is necessary that the polymer be able to compete with the solvent for the surface. To this end, the polymer should have groups which are at least as polarizable (the ability to have a local dipole induced by an external charge) as the solvent, and preferably more polarizable; or, which have a dipole moment at least as great as the solvent; or, which are capable of chemisorption to the metal surface to a degree as great or greater than the solvent.

By virtue of the polymer's ability to be absorbed on the metal surface, the polymer will form an envelope around the metal. If the monomeric groups are not too strongly adsorbed as compared to the solvent (e.g., too polar), the polymer will not adsorb as a thin dense film, but rather will be penetrated and swollen by solvent so as to give a voluminous adsorbed envelope. This thick film acts as a physical buffer to prevent coagulation of the chains of particles, as well as direct contact between adjacent particles in the chains.

The polymer should have the following characteristics:

(1) That it is an addition polymer;

(2) That it has a molecular weight of at least 10,000;

(3) That a majority of the monomers (85%) have at least one chalcogen of atomic number 8 through 16, that is, oxygen or sulfur;

(4) That a majority of the chalcogen (75%) be bonded to a pendant alkyl group of at least 5 carbons; and (5) The polymer should be flexible and have a minimum of cross-linking.

A section of the polymer would appear according to the following formula:

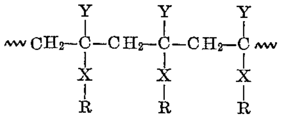

wherein Y is hydrogen or hydrocarbyl of up to 8 carbons, X is generally a functional group having at least one chalcogen and R is a hydrocarbyl group of from 5 to 25 carbons. The Y's, X's and R's may be the same or different.

Considering Y first. Preferred Y's are hydrogen or lower alkyl, e.g., methyl, ethyl, propyl, etc. Particularly preferred is Y being hydrogen or methyl.

R is preferably hydrocarbyl of from 5 to 16 carbons. R may be aliphatic, aromatic, aralkyl, alkaryl, alicyclic, etc. Preferred R's are aliphatic. Particularly preferred are alkyl groups of from 6 to 12 carbons.

X is a functionality having at least one chalcogen, i.e., oxygen or a sulfur. X is a divalent radical and may be oxygen (ether), sulfur (thioether), carboxy and its thio analogs, oxo-carbonyl and its thio analogs, etc. Particcularly preferred is when X is a carboxy group, with the carbonyl either bonded to the polymeric chain as in polymers derived from acrylates or bonded to the side chain R as in polymers prepared from vinyl esters.

As already indicated, the various Y's, X's and R's may be different, and therefore the polymer may be a homopolymer or a copolymer of as many monomers as desired. Usually, not more than 5 monomers will be used, but this is a matter of expediency. Mixtures of polymers may also be used, but commonly only one polymer will be used.

Up to 25%, preferably 15%, by number of monomers other than those indicated may be present in the polymer. The monomers must not be significantly more polar than the remainder of the polymer. Illustrative monomers are hydrocarbon monomers of from 8 to 12 carbons, styrene, p-methyl styrene, p-t-butyl styrene, etc.; non-oxo-carbonyl containing monomers of 4 to 10 carbons; methyl methacrylate, ethyl acrylate, butyl methacrylate, vinyl butyrate, N-methyl acrylamide, etc., (those with pendant groups of less than 5 carbons) and halohydrocarbon monomers of from 2 to 18 carbons; vinyl fluoride, p-chlorostyrene, etc.

Polymers having a large number of groups with hydrogens bonded to heteroatoms, such as oxygen, nitrogen and sulfur, should be avoided. However, in a few instances a low percentage of these groups may be advantageous for particular applications employing the ferromagnetic iron chain compositions. Generally, the polymer should not contain more than about 5% by number of monomers containing groups having hydrogen bonded to a heteroatom, e.g., hydroxyl.

The monomers will usually be in the range of about 7 to 25 carbon atoms. More usually in the range of about 8 to 18 carbon atoms. Various monomers which find use are vinyl ethers, vinyl ketones, vinyl esters, acrylates (including acrylates substituted in the α-position), etc. Illustrative of particular monomers are octyl vinyl ether, pentyl vinyl thioether, benzyl vinyl thioether, p-t-butylbenzyl vinyl ether, 1-decyl vinyl ketone, 2-nonyl vinyl ketone, phenyl vinyl ketone, octyl acrylate, dodecyl methacrylate, vinyl octonoate, vinyl hexadecanoate, eicosyl acrylate, etc.

The monomers used for the formation of polymers in this invention have the following formula:

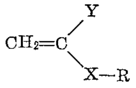

wherein R and Y are as defined previously, and X has the following formula:

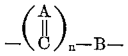

wherein A and B are chalcogen of atomic number 8 through 16 and *n* is a cardinal number, either 0 or 1. Radicals included within the scope of the formula are:

$$-O-,\ -S-,\ -\overset{O}{\overset{\|}{C}}-O,\ -\overset{O}{\overset{\|}{C}}-S,\ -\overset{O}{\overset{\|}{C}}-,\ \text{etc.}$$

While the use of polystyrene will provide chains, colloidal suspensions are not obtained. The particles formed sediment to the bottom of the vessel, but when spread for an electron photomicrograph appear as chains. For particular applications, polystyrene of 100,000 to 1,000,000 molecular weight may find use.

The polymers have a molecular weight of about 10,000 or higher, preferably about 25,000. The molecular weight may be a million or higher, but will generally not exceed a million. With polymers of excessively high molecular weight, problems of solubility are encountered. Polymers of very high molecular weight are generally avoided because of expediency.

The amount of iron compound must be sufficient to provide at least 35% of the weight of the metal as particles of about 100 A. or larger. The weight ratio of polymer to iron metal will usually be at least 0.01, and more usually in the range of 0.02–1:1, preferably 0.1–0.5:1. (By weight metal is intended the theoretical weight of metal obtained by decomposition of the metal-organic compound.) The weight ratio of solvent to metal will usually be in the range of about 15:1 to about 100:1, but preferably in the range of about 25:1 to 75:1.

Once the composition is prepared, it may be treated in various ways. It may be diluted to where the weight percent of solvent is 99%. Polymer may be added or removed. Or the solvent can be removed by various ways, such as evaporation, so that a dry dispersion of metal remains. The weight percent of metal may vary from 0.1 to 98%.

The stable colloidal suspension will generally have at least about 75% by weight of solvent. The amount of solvent may be increased to any amount desired, and may be decreased to as little as about 65% by weight. The metal will generally be from about 0.1% by weight to as high as 20% by weight or higher. The polymer-to-metal ratio will generally be in the range of about 0.01–1:1.

The temperature used in the preparation of the iron particles will depend on the method of decomposition, the organo-iron compound, and the particular solvent and polymer used. It is found that both polymer and solvent have an effect on the rate of decomposition. Usually, the temperature will be in the range of about −50° C. to about 250° C. Relatively low temperatures may be used when methods other than heat are used for the decomposition. In the thermal decomposition of iron carbonyl, temperatures will usually be in the range of about 110° C. to 225° C., preferably in the range of about 125° C. to 200° C.

The pressure for the system will generally be autogenous. However, higher pressures may be useful, particularly when using low boiling solvents. Pressures will generally not be above 250 p.s.i. However, the pressure is not critical and will have only an insignificant effect on the process as long as the pressure of carbon monoxide is below the decomposition pressure of the iron carbonyl compound, when carbonyl compounds are used.

The method of addition of the organo-iron compound may be either batchwise or incremental. All the components may be put together in a flask and brought to the desired temperature. Alternatively, the polymer and solvent may be mixed together and the organo-metallic compound added as a solid or in a suitable solvent.

The process may be batch or continuous.

The time for the addition will vary according to the compound being used, the temperature at which the reaction is run, and the method of decomposition. Usually, the time may vary from 1 or 2 minutes to 60 hours or more. Preferably, the time will range from about 5 minutes to about 48 hours. The time is not critical and will generally be determined by the end of the carbon monoxide revolution. Running the reaction to completion is not essential, but is expedient. When discussing concentrations, it is intended that the reactions have been run to completion.

It is preferred to carry out the reactions in the absence of oxygen. However, small amounts of oxygen may be present. Gases, such as nitrogen, carbon monoxide, helium, argon, etc., may be used to provide an inert atmosphere for the process.

As previously indicated, the product is usually a stable colloidal suspension. Sometimes, however, the mixture is thixotropic and occasionally, with some polymers and at some metal concentrations, sedimentation occurs. For most uses, it is not necessary to have a stable suspension. Thixotropic mixtures will flow with stirring. Even the products that sediment are usually sufficiently fluid to be spread.

The reaction is conveniently run by introducing the desired solvent, the metal-organo compound and the polymer into a reaction vessel. The vessel is fitted with stirring and condensing means and is swept free of oxygen with nitrogen. When the method of decomposition is thermal, the system can be conveniently heated by a variety of means. The temperature may be controlled by being the reflux temperature of the solvent. With iron carbonyl compounds, the mixture is then refluxed until the theoretical amount of carbon monoxide has been evolved and often for a short period longer.

It has been found, with the decomposition of carbonyl compounds, that it is preferable to have a refluxing solvent. In this way, the carbon monoxide is rapidly removed from the reaction medium. Moreover, it is preferable to have a rather rapid rate of reflux, rather than just a mild reflux.

The product is then cooled and is usually examined either for its magnetic properties in a B-H meter or its appearance in an electron microscope or both. Most frequently, the original product appears as a black suspension.

In taking the electron micrographs, a 1 ml. sample was diluted to total of 10 ml., shaken and one drop smeared on an electron microscope sample grid (Formvar Substrate-Ladd Research Industries). After drying, electron photomicrographs of the sample were taken using a J.E.M. Model 6A electron microscope. Usually 25,000 magnification was used, and the photograph enlarged 4 times.

When determining the magnetic properties of the iron particle composition, the sample was stirred in a high shear blender for about 1 minute. The mixture was then coated on a 1 mil Mylar (Du Pont terephthalate polyester) with a paint applicator. The applicator gate was set to give a dry coating of 0.1 to 0.2 mil thick. The coating was dried mostly by evaporation; the final drying was accomplished using an infrared lamp.

Magnetic properties of the particles were measured with a B-H meter (Scientific Atlanta, Inc., Model 651B). When referrring to "B" (flux density), what is intended is B–H or $4\pi I$, where I is the intensity of magnetization and H is the strength of the applied field. Therefore, values are reported as intrinsic coercive force, namely, the reverse field necessary to bring the quantity B-H back to zero.

The following examples are by way of illustration and not limitation.

*Example 1*

Into a flask fitted with a stirrer and reflux condenser was introduced 25 ml. of iron pentacarbonyl, 2.86 g. of polyhexyl methacrylate of about 100,000 molecular weight and 500 ml. of xylene. The flask was swept with nitrogen and then heated to reflux. The theoretical amount of carbon monoxide had evolved after about 14 hours, and the flask was removed from the heating bath. The black dispersion was inspected in an electron microscope and in a B-H meter. FIG. 1 shows an unoriented sample at 100,000 magnification. The product had a coercive force of 323 oersteds in a 2000-oersted field and a remanence ratio of 0.54.[1]

*Example 2*

In an apparatus as described in Example 1 was introduced 25 ml. of iron pentacarbonyl, 2.86 g. of polyhexyl methacrylate of about 100,000 molecular weight, and 240 ml. of xylene. The flask was then swept with nitrogen and heated to reflux. The theoretical amount of carbon monoxide had evolved in 21 hours, and the flask was removed from the heating bath. The black dispersion was inspected in an electron microscope and in a B–H meter. FIG. 2 shows an electron micrograph at 100,000 magnification. The coercive force was 192, and the remanence ratio was 0.54.

The following table is a recapitulation in tabular form of the previous two experiments as well as a number of additional experiments carried out in the manner described in Examples 1 and 2.

[1] Unless otherwise indicated, the field used to measure the coercive force is 2000 oe.

TABLE I

| Polymer [1] | Approx. M.W.×$10^5$ | Gms. | $Fe(CO)_5$, ml. | Solvent [2] | Ml. | Additive [3] | Ml. | Time, Hrs. | $H_{ic}$,[4] 2,000 oe. | $B_r/B_s$ | Fig. |
|---|---|---|---|---|---|---|---|---|---|---|---|
| HMA | 1 | 2.86 | 25 | X | 240 | | | 21 | 192 | 0.54 | II |
| HMA | 1 | 2.86 | 25 | X | 500 | | | 14 | 323 | 0.54 | I |
| HMA | 1 | 2.38 | 25 | X | 500 | | | 14 | 184 | 0.41 | |
| HMA | 1 | 1.91 | 25 | X | 500 | | | 13 | 296 | 0.49 | |
| HMA | 1 | 1.43 | 25 | X | 500 | | | 15 | 499 | 0.51 | |
| LMA-BMA | 3 | 3.00 | 25 | X | 500 | | | 12 | 346 | 0.51 | |
| LMA-BMA | | 3.00 | 25 | X | 500 | DPM | 5 | 13 | 707 | 0.56 | |
| LMA-BMA | | 3.00 | 25 | X | 500 | AP | 2 | 13 | 461 | 0.47 | |
| LMA-BMA | | 3.00 | 25 | X | 500 | DPM | 2.5 | 14 | 492 | 0.51 | |
| LMA-BMA | | 6.00 | 25 | X | 500 | DPM | 5 | 13 | 208 | 0.43 | |
| LMA-BMA | | 3.00 | 25 | X | 500 | DPM | 5 | 14 | 660 | 0.58 | |
| EHA | | 3.00 | 25 | X | 500 | | | 12 | 461 | 0.54 | |
| LMA | 5 | 3.00 | 25 | X | 500 | | | 14 | 326 | 0.51 | |
| LMA-S (90:10) | 1 | 3.00 | 25 | X | 500 | | | 10 | 461 | 0.50 | |
| LMA-MMA | 1.3 | 3.00 | 25 | X | 500 | | | 10 | 380 | 0.50 | |
| LMA | 1 | 3.00 | 25 | X | 500 | | | 10 | 380 | 0.50 | |
| S | | | | | | | | | 410 | 0.41 | |

[1] HMA—hexyl methacrylate.
LMA-BMA—lauryl methacrylate-butyl methacrylate (95:5).
EHA—2-ethylhexyl acrylate.
LMA—lauryl methacrylate.
LMA-S—lauryl methacrylate-styrene (85:15).
LMA-NMA—lauryl methacrylate-methyl methacrylate (90:10).
S—styrene.
[2] X—xylene.
[3] DPM—dipropoxymethane.
AP—acetophenone.
[4] Intrinsic coercive force.

While the polymers which must be used to prepare the novel compositions are restricted to those described, once the metal-polymer composition has been prepared, the polymer can be replaced for the most part by another polymer.

The exchange may be achieved by leaching away the polymer with a solvent, dispersing the resulting polymer-metal composition in a different polymer or solution of a different polymer, and then further extracting this composition with solvent. Partition between the metal polymer composition and the solvent can be achieved by various methods, such as centrifugation, sedimentation, etc. Usually, little of the original polymer will remain.

The polymer compositions prepared according to the method of this invention are unique. Each iron particle as it is formed is encapsulated with polymer. Secondly, stable dispersions of the particles can be obtained in a low dielectric constant medium. By stable dispersions is meant a particulate system in which sedimentation is not observed in a period of one day under ambient conditions and normal gravitational force. Thirdly, the particles are of relatively uniform size. Fourthly, and most significant, because prior to this time such a composition was unknown, the particles exist in an organized arrangement. The organized arrangement results in shape anisotropy, which significantly enhances the coercive force of the metal.

The dispersed particles are easily rotated in the dispersion. Polymer particle films can be dried in a magnetic field and can become magnetically anistropic in directions parallel and perpendicular to the orienting field. By orienting the particles, relatively square hysteresis loops can be obtained. Therefore, when the field is removed, a high percentage of the maximum saturation will remain. The orientation occurs even though the particles are frequently nearly spherical and of small size. The orientation of the chains is greatly enhanced by the presence of the organized arrangement as compared to particles randomly dispersed. The effects of such orientation can be profound and have no counterpart in systems prepared by other than this invention.

In systems which have a large percentage of the metal present as particles which are not in chains, the contributions of the coercive force of the chain may not be significant. Moreover, the coercive force of chains will not be high in every instance. In preparations where relatively large separations exist between the particles, coercive forces will be low.

The preferred preparations of this invention are those having a coercive force without orientation of at least 175 and preferably 250 oe., in a 2000 oe. field. Usually, these compositions will also have a remanence ratio of 0.4 or more, preferably 0.5. The preferred compositions will have coercive forces in the range of about 350 to 800 oe. This range finds particular use for magnetic tapes.

The compositions containing the iron have a wide variety of uses. The metal dispersed in the polymer provides a convenient and unique way for coating magnetic recording devices, such as tapes, discs, drums, etc. The small size of the particle permits a smooth coat and a magnetic recording medium of greatly reduced noise level. Moreover, high pulse-packing density can be obtained. The high saturation magnetization of the metal particles gives enhanced output, resulting in excellent high and low frequency response.

Permanent magnets may be prepared with the compositions containing the iron particles. The metal polymer composition may be embedded in a variety of polymers to form a solid material. These permanent magnets can be of light weight and permit easy machineability, moldability and fashioning.

As will be evident to those skilled in the art, various modifications in this process can be made or followed, in the light of the foregoing disclosure and discussion, without departing from the spirit or scope of the disclosure or from the scope of the following claims.

What I claim is:

1. A method of preparing iron particles which are:
(1) discrete,
(2) dispersed in an organic medium,
(3) of a size in the range of about 100 to 1000 A.,
(4) existing in an organized linear arrangement, each unit having at least 5 members;

which comprises:

decomposing by electromagnetic radiation in a homogeneous composition, an organo-iron compound, wherein iron has at least one coordinate bond to carbon, which is present in an amount sufficient to form a substantial amount by weight of the metal as particles of at least 100 A., in the presence of, as a major component, from 85 to 100% by weight of the total solvent of an inert solvent of dielectric constant of from 1.7 to 2.5 selected from the group consisting of hydrocarbons and inert halohydrocarbons and as a minor component from 0 to 15% by weight of the total solvent of an organic material having a chalcogen of atomic number 8 through 16 and selected from the group consisting of ethers, ketones, esters, and their thio analogs, in the presence of a flexible polymer of at least 10,000 molecular weight wherein at least 85% of the monomers have the following formula:

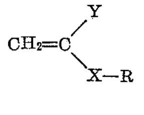

wherein Y is selected from the group consisting of hydrogen and hydrocarbyl of up to 8 carbons, R is a hydrocarbyl group of from 5 to 16 carbons and X is of the formula:

$$-\left(\overset{\overset{\displaystyle A}{\|}}{C}\right)_n-B-$$

wherein A and B are chalcogen of atomic number 8 through 16 and $n$ is a cardinal number varying from 0 to 1, and wherein the weight ratio of polymer to metal is at least 0.01–1:1.

2. A method of preparing iron particles which are:
(1) discrete,
(2) dispersed in an organic medium,
(3) of a size in the range of about 100 to 1000 A.,
(4) existing in an organized linear arrangement, each unit having at least 5 members;

which comprises:

thermally decomposing in a homogeneous solution at a temperature in the range of about 110° to 250° C., an organo-iron compound, wherein iron has at least one coordinate bond to carbon, which is present in an amount sufficient to form a substantial amount by weight of the metal as particles of at least 100 A., in the presence of, as a major component, from 85 to 100% by weight of the total solvent of an inert solvent of dielectric constant of from 1.7 to 2.5 selected from the group consisting of hydrocarbons and inert halohydrocarbons and as a minor component from 0 to 15% by weight of the total solvent of an organic material having a chalcogen of atomic number 8 through 16 and selected from the group consisting of ethers, ketones, esters, and their thio analogs, in the presence of a flexible polymer of at least 10,000 molecular weight wherein at least 85% of the monomers have the following formula:

$$CH_2{=}C\begin{matrix}\diagup Y\\ \diagdown X-R\end{matrix}$$

wherein Y is selected from the group consisting of hydrogen and hydrocarbyl of up to 8 carbons, R is a hydrocarbyl group of from 5 to 16 carbons and X is of the formula:

$$-\left(\overset{\overset{\displaystyle A}{\|}}{C}\right)_n-B-$$

wherein A and B are chalcogen of atomic number 8 through 16 and $n$ is a cardinal number varying from 0 to 1, and wherein the weight ratio of polymer to metal is at least 0.01–1:1.

3. A method according to claim 2 wherein the temperature is in the range of about 125° to 200° C. and said organo-iron compound is iron pentacarbonyl.

4. A method of preparing iron particles which are:
(1) discrete,
(2) dispersed in an organic medium,
(3) of a size in the range of about 100 to 500 A.,
(4) existing in an organized linear arrangement, each unit having at least 5 members;

which comprises:

thermally decomposing in a homogeneous solution at a temperature in the range of about 110° to 225° C., an iron carbonyl compound, present in an amount sufficient to form at least 35% by weight of the metal as particles of at least 100 A., in the presence of, as a major component, from 95 to 100% by weight of an inert aromatic hydrocarbon solvent and as a minor component from 0 to 5% by weight of an organic material selected from the group consisting of ketones, ethers, esters and their thio analogs, in the presence of an addition polymer of at least about 25,000 molecular weight and having at least 75% by number of monomers of the following formula:

$$CH_2{=}C\begin{matrix}\diagup Y\\ \diagdown X-R\end{matrix}$$

wherein Y is selected from the group consisting of hydrogen and lower alkyl, R is hydrocarbyl of from 5 to 16 carbons, and X is of the formula:

$$-\left(\overset{\overset{\displaystyle A}{\|}}{C}\right)_n-B-$$

wherein A and B are chalcogen of atomic number 8 through 16 and $n$ is 1, and wherein the weight ratio of polymer to metal is at least 0.01:1.

5. A method according to claim 4 wherein the weight ratio of polymer to iron metal is in the range of about 0.02–1:1.

6. A method according to claim 4 wherein the weight ratio of polymer to iron metal is in the range of about 0.1–0.5:1 and the weight ratio of solvent to metal is in the range of about 15:1 to about 100:1.

7. A method according to claim 4 wherein the weight ratio of polymer to iron metal is in the range of about 0.1–0.5:1 and the weight ratio of solvent to iron metal is in the range of about 25:1 to 75:1.

8. A method of preparing iron particles which are:
(1) discrete,
(2) dispersed in an organic medium,
(3) of a size in the range of about 100 to 500 A.,
(4) existing in an organized linear arrangement, each unit having at least 5 members;

which comprises:

thermally decomposing in a homogeneous solution at a temperature in the range of about 125 to 200° C. an organo-iron compound wherein the iron is bonded to carbonyl and is present at a concentration sufficient to provide at least 35% by weight of the metal as particles of at least 100 A. in size, in the presence of, as a major component, from 95 to 100% by weight of an aromatic hydrocarbon solvent of from 6 to 10 carbons and from 0 to 5% by weight of an ether, in the presence of an acrylate polymer wherein the alkoxy group is from 6 to 12 carbons.

9. A stable colloidal suspension consisting esentially of:
(1) discrete iron particles
(a) of a size in the range of about 100 to 1000 A.,
(b) encapsulated in a polymeric envelope, wherein the polymer is of at least 10,000 molecular weight,
(c) existing as an organized linear arrangement having at least 5 members; and
(2) an inert solvent of dielectric constant 1.7 to 2.5 in an amount of from about 75 to 99% by weight of said suspension, and wherein said polymer is a flexible polymer having at least 85% of the monomers of said polymer of the following formula $$CH_2{=}C\begin{matrix}\diagup Y\\ \diagdown X-R\end{matrix}$$

wherein Y is selected from the group consisting of hydrogen and hydrocarbyl of up to 8 carbon atoms, R is a hydrocarbyl group of from 5 to 16 carbon atoms and X is of the formula $$-\left(\overset{\overset{\displaystyle A}{\|}}{C}\right)_n-B-$$

wherein A and B are chalcogen of atomic number 8 through 16 and $n$ is a cardinal number varying from 0 to 1.

10. A composition according to claim 9 wherein said solvent is an aromatic hydrocarbon.

11. a dispersion consisting essentially of:

(1) discrete iron particles (a) of a size in the range of about 100 to 500 A., (b) encapsulated in a polymeric envelope wherein the polymer is of at least 10,000 molecular weight, (c) existing in an organized linear arrangement having at least 5 members; and (2) an inert solvent of dielectric constant 1.7 to 2.5;

wherein the solvent varies from 0 to 99% by weight, the amount of metal varies from 0.1 to 98% by weight, and the amount of polymer varies from 0.01 to 99% by weight, and wherein said polymer is a flexible polymer having at least 85% of the monomers of said polymer of the following formula

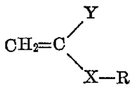

wherein Y is selected from the group consisting of hydrogen and hydrocarbyl of up to 8 carbon atoms, R is a hydrocarbyl group of from 5 to 16 carbon atoms and X is of the formula $$-\left(\overset{A}{\overset{\|}{C}}\right)_n-B-$$

wherein A and B are chalcogen of atomic number 8 through 16 and $n$ is a cardinal number varying from 0 to 1.

12. A method of preparing iron particles which are:

(1) discrete, (2) dispersed in an organic medium, (3) of a size in the range of about 100 to 1000 A., (4) existing in an organized linear arrangement, each unit having at least 5 members;

which comprises:

thermally decomposing in a homogeneous solution at a temperature in the range of about 110° to 225° C. an iron carbonyl compound present in an amount sufficient to form at least 35% by weight of the metal as particles of at least 100 A.

in the presence of, as a major component, from 85 to 100% by weight of the total solvent of an inert solvent of dielectric constant of from 1.7 to 2.5 selected from the group consisting of hydrocarbons and inert halohydrocarbons and, as a minor component, from 0 to 15% by weight of the total solvent of an organic material having a chalcogen of atomic number 8 through 16 and selected from the group consisting of ethers, ketones, esters, and their thio analogs, in the presence of polystyrene of from 100,000 to 1000,000 molecular weight, and wherein the ratio of polymer to metal is at least 0.01–1:1.

References Cited by the Examiner

UNITED STATES PATENTS

| | | | |
|---|---|---|---|
| 2,730,441 | 1/1956 | Crowley | 75—0.5 |
| 2,776,200 | 1/1957 | Wallis | 75—0.5 |
| 2,833,723 | 5/1958 | Iler | 252—308 |
| 2,900,343 | 8/1959 | Barns et al. | 252—62.5 |
| 3,014,818 | 12/1961 | Campbell | 252—513 |
| 3,073,785 | 1/1963 | Angelo | 252—513 |
| 3,200,007 | 8/1965 | Flowers. | |

TOBIAS E. LEVOW, *Primary Examiner.*

DAVID L. RECK, MAURICE A. BRINDISI, *Examiners.*

N. F. MARKVA, R. D. EDMONDS, *Assistant Examiners.*